US011027593B2

(12) United States Patent
Eberspach

(10) Patent No.: US 11,027,593 B2
(45) Date of Patent: Jun. 8, 2021

(54) COMBUSTION CHAMBER ASSEMBLY UNIT

(71) Applicant: Eberspächer Climate Control Systems GmbH & Co. KG, Esslingen (DE)

(72) Inventor: Günter Eberspach, Wolfschlugen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 461 days.

(21) Appl. No.: 15/866,977

(22) Filed: Jan. 10, 2018

(65) Prior Publication Data
US 2018/0194198 A1     Jul. 12, 2018

(30) Foreign Application Priority Data
Jan. 11, 2017   (DE) .................. 10 2017 100 430.0

(51) Int. Cl.
*B60H 1/22* (2006.01)
*F23D 3/40* (2006.01)
*F23J 3/06* (2006.01)
*F23C 13/00* (2006.01)
*F23J 15/02* (2006.01)

(52) U.S. Cl.
CPC .......... *B60H 1/2209* (2013.01); *F23C 13/00* (2013.01); *F23D 3/40* (2013.01); *F23J 3/06* (2013.01); *F23J 15/02* (2013.01); *B60H 1/2203* (2013.01); *B60H 2001/2268* (2013.01); *F23C 2700/026* (2013.01); *F23J 2219/10* (2013.01); *F23N 2241/14* (2020.01)

(58) Field of Classification Search
USPC ....................................... 237/12.3 C; 431/90
See application file for complete search history.

(56) References Cited

U.S. PATENT DOCUMENTS

| 7,703,275 | B2 | 4/2010 | Asanuma et al. |
| 8,475,753 | B2 | 7/2013 | Eckhoff et al. |
| 9,897,311 | B2 * | 2/2018 | Collmer ............... B60H 1/2203 |
| 2008/0110427 | A1 * | 5/2008 | Ricci-Ottati ............ B01J 8/0278 |
| | | | 123/1 A |

(Continued)

FOREIGN PATENT DOCUMENTS

| CN | 1802491 A | 7/2006 |
| CN | 102369058 A | 3/2012 |
| DE | 37 13 448 A1 | 11/1988 |

(Continued)

OTHER PUBLICATIONS

Basshuysen, Richard van [Hrsg.]; Schäfer, Fred [Hrsg.]: Handbuch Verbrennungsmotor. 7. vollst. überarb, and erw, Aufl. Wiesbaden : Springer, 2015, S,839-851.

*Primary Examiner* — Kenneth J Hansen
*Assistant Examiner* — John E Bargero
(74) *Attorney, Agent, or Firm* — McGlew and Tuttle, P.C.

(57) ABSTRACT

A combustion chamber assembly unit for a fuel-operated vehicle heater is provided. The combustion chamber assembly includes a combustion chamber housing (12) with a combustion chamber (18), which is defined by a circumferential wall (14) and by a bottom area (16). An oxidation catalytic converter device (54), through which combustion waste gases can flow, is provided downstream in relation to the combustion chamber (18). The combustion chamber assembly further includes a hydrocarbon storage device (74) or/and a nitrogen storage device (76).

20 Claims, 1 Drawing Sheet

(56) References Cited

U.S. PATENT DOCUMENTS

2010/0180582 A1* 7/2010 Mueller-Stach ..... B01J 35/0006
60/297

FOREIGN PATENT DOCUMENTS

| | | |
|---|---|---|
| DE | 102 00 962 A1 | 7/2003 |
| DE | 102 55 361 B3 | 6/2004 |
| DE | 10 2006 000074 A1 | 9/2006 |
| DE | 10 2010 033688 A1 | 3/2011 |
| DE | 10 2012 215 414 A1 | 1/2014 |
| EP | 0 638 776 A1 | 2/1995 |
| EP | 2 930 425 A1 | 10/2015 |
| JP | 2003097255 A | 4/2003 |
| JP | 2003237353 A | 8/2003 |
| RU | 2542159 C2 | 2/2015 |
| WO | 2005054637 A1 | 6/2005 |

* cited by examiner

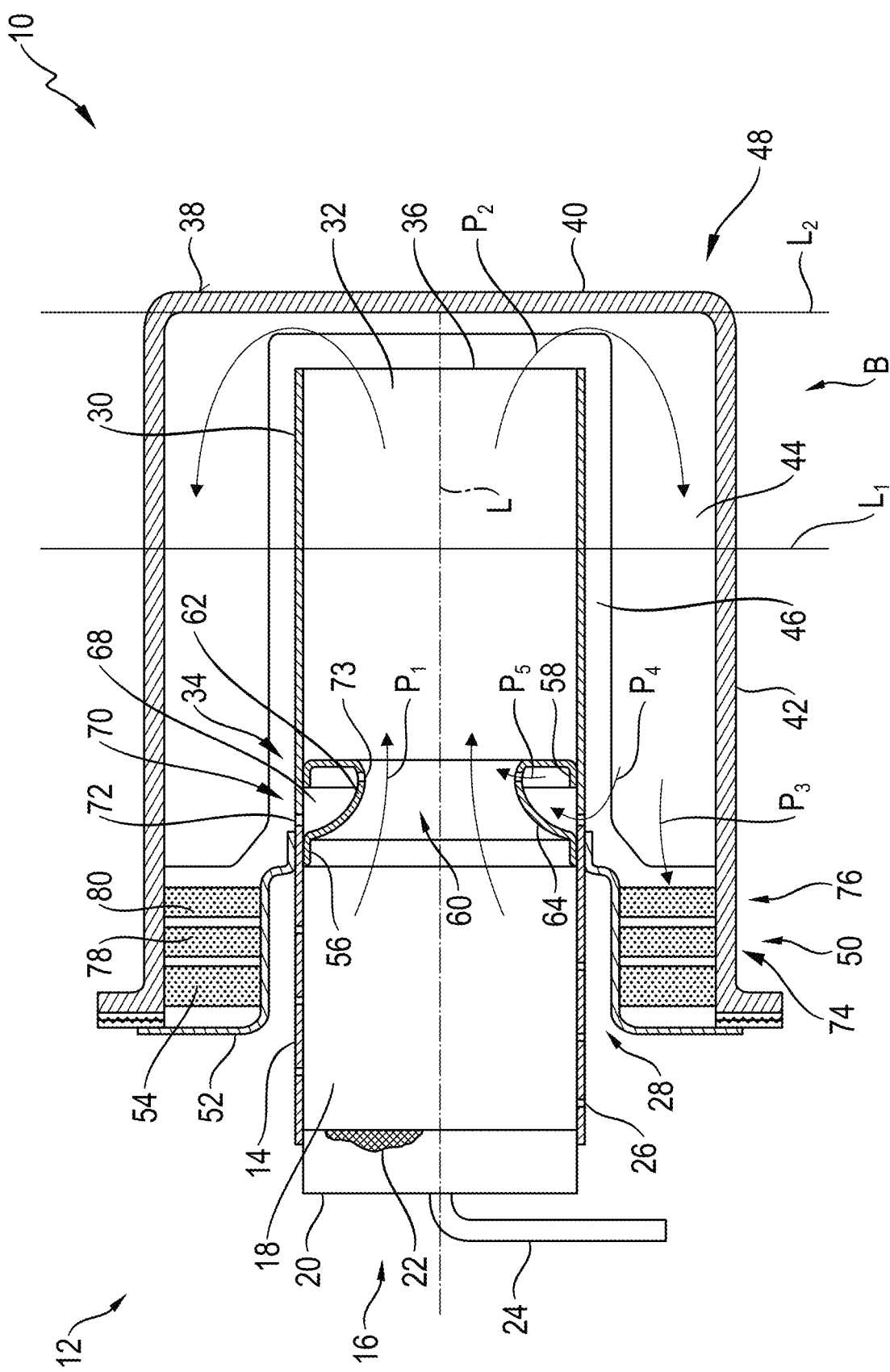

COMBUSTION CHAMBER ASSEMBLY UNIT

CROSS REFERENCE TO RELATED APPLICATIONS

This application claims the benefit of priority under 35 U.S.C. § 119 of German Application DE 10 2017 100 430.0, filed Jan. 11, 2017, the entire contents of which are incorporated herein by reference.

FIELD OF THE INVENTION

The present invention pertains to a combustion chamber assembly unit for a fuel-operated vehicle heater, comprising a combustion chamber housing with a combustion chamber defined by a circumferential wall and a bottom area, wherein an oxidation catalytic converter device, through which combustion waste gases can flow, is provided downstream in relation to the combustion chamber.

BACKGROUND OF THE INVENTION

A combustion chamber assembly unit, in which an oxidation catalytic converter device formed in a waste gas backflow space formed between a flame tube and a housing surrounding this downstream of a combustion chamber is provided to convert CO and HC contained in the combustion waste gases leaving the combustion chamber into $CO_2$ and $H_2O$, is known from the subsequently published German Patent Application DE 10 2016 117 408. To carry out this catalytic reaction, it is necessary for the catalyst material supported on a substrate to have a temperature of at least 250° C. to 300° C. If the temperature of the catalyst material of the oxidation catalytic converter device is below a light-off temperature in this range, the catalytic reaction does not start, and the combustion waste gases leave a heater equipped with such a combustion chamber assembly unit essentially untreated and with a high pollutant level.

SUMMARY OF THE INVENTION

An object of the present invention is to provide a combustion chamber assembly unit for a fuel-operated vehicle heater, with which the pollutant emission can be lowered during the combustion operation.

This object is accomplished according to the present invention by a combustion chamber assembly unit for a fuel-operated vehicle heater, comprising a combustion chamber housing with a combustion chamber defined by a circumferential wall and a bottom area, wherein an oxidation catalytic converter device, through which combustion waste gases can flow, is provided downstream in relation to the combustion chamber.

The combustion chamber assembly unit is characterized in that a hydrocarbon storage device or/and a nitrogen oxide storage device is provided.

By providing a hydrocarbon storage device, hydrocarbons are stored or temporarily stored especially during phases of the operation during which the catalytically supported conversion of CO and HC does not take place because of the excessively low temperature of the catalyst material, so that such hydrocarbons can be converted in the oxidation catalytic converter device after heating of the entire system and hence also after the onset of the release of the hydrocarbons being stored in the hydrocarbon storage device.

The provision of a nitrogen oxide storage device makes it possible to substantially lower the percentage of the nitrogen oxide being transported in the combustion waste gases to the outside regardless of additional measures for reducing the nitrogen oxide emission. If the nitrogen oxide storage device reaches a state of saturation, in which a further uptake of nitrogen oxide is not possible, the nitrogen oxide storage device can be regenerated in a regeneration operation, for example, under substoichiometric combustion conditions.

The hydrocarbon storage device preferably comprises a hydrocarbon storage catalytic converter. To guarantee in this connection that hydrocarbon being stored in it is released again essentially only when the oxidation catalytic converter device is capable of converting the hydrocarbon being released again by means of the catalytic reaction to be carried out in it, it is further proposed that a desorption temperature of the hydrocarbon storage catalytic converter be higher than a light-off temperature of the oxidation catalytic converter device. To guarantee this, the hydrocarbon storage catalytic converter may be made of, for example, zeolite material.

The nitrogen oxide storage device may comprise a nitrogen oxide storage catalytic converter. To guarantee that this is capable of storing nitrogen oxide in a temperature range in which the temperature of the nitrogen oxide storage catalytic converter will be, in general, during the combustion operation of the combustion chamber assembly unit, it is proposed that the nitrogen oxide storage catalytic converter be made of barium.

To ensure that hydrocarbon released again from the hydrocarbon storage device can be converted in the oxidation catalytic converter device and the nitrogen oxide storage device can operate at a suitable temperature, it is proposed that the hydrocarbon storage device or/and the nitrogen oxide storage device be arranged upstream in relation to the oxidation catalytic converter device.

For an arrangement of the storage devices that is optimal for the temperature necessary for the operation of the different storage devices, it is proposed that a flame tube be provided, which follows the circumferential wall in the direction of the housing longitudinal direction and is open in the direction of the housing longitudinal direction, wherein a waste gas backflow space is formed between the flame tube and a housing surrounding this flame tube, wherein the oxidation catalytic converter device or/and the hydrocarbon storage device or/and the nitrogen storage device is arranged in the waste gas backflow space. The device selected in this connection is preferably such that the waste gas flow space is open towards the waste gas backflow space in a first axial end area of the waste gas backflow space and that the oxidation catalytic converter device or/and the hydrocarbon storage device or/and the nitrogen oxide storage device is provided in a second axial end area of the waste gas backflow space.

To make it possible to achieve an optimal thermal interaction for the oxidation catalytic converter device or the different storage devices in a combustion chamber assembly unit configured according to the present invention, it is proposed that a combustion air feed space surrounding the circumferential wall be open towards the combustion chamber via a plurality of combustion air feed openings provided in the circumferential wall and that a partition separating the combustion air feed space from the waste gas backflow space be provided, wherein the oxidation catalytic converter device or/and the hydrocarbon storage device or/and the nitrogen storage device be arranged such that it surrounds or/and axially adjoins the partition. Provisions may be made in this connection, in particular, for the oxidation catalytic converter device or/and the hydrocarbon storage device or/and the nitrogen oxide storage device be arranged between the partition and the housing.

To further reduce the nitrogen oxide emission, a flame diaphragm with a flow-through opening may be provided in the combustion chamber assembly unit configured according to the present invention, wherein a waste gas return opening device is provided in the axial area of the flame diaphragm for returning combustion waste gases flowing in the waste gas backflow space into the combustion chamber or/and into the waste gas flow space.

In the assembly unit according to the present invention, the bottom area may have an evaporator medium carrier and an evaporator medium, which is porous on the side of the evaporator medium carrier facing the combustion chamber. The housing may be an essentially pot-shaped heat exchanger housing with a bottom wall located axially opposite a flame tube and with a heat exchanger housing circumferential wall that surrounds the flame tube and defines the waste gas backflow space radially outwardly.

The present invention further pertains to a vehicle heater, comprising a combustion chamber assembly unit configured according to the present invention.

The present invention will be described in detail below with reference to the attached FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 1 is a longitudinal sectional view of a fuel-operated combustion chamber assembly unit for a vehicle heater.

DESCRIPTION OF THE PREFERRED EMBODIMENTS

Referring to the drawings, the combustion chamber assembly unit 10 shown in FIG. 1 comprises a combustion chamber housing generally designated by 12. The combustion chamber housing 12 encloses a combustion chamber 18 with a circumferential wall 14 and a bottom area 16. The bottom area 16 may be configured with an evaporator medium carrier 20 having, for example, a pot-shaped configuration and with a porous evaporator medium 22 carried on the side thereof facing the combustion chamber 18. Liquid fuel fed via a fuel feed line 24 by a fuel feed device, for example, a feed pump, is fed into the porous evaporator medium 22 and evaporated from this in the direction of the combustion chamber 18. To support the evaporation of the fuel especially during a start phase of the combustion operation, the bottom area 16 may comprise an electrically energizable heating device on the side of the porous evaporator medium 22 or/and of the evaporator medium carrier 20 facing away from the combustion chamber 18.

To feed combustion air into the combustion chamber 18, the circumferential wall 14 has a plurality of combustion air feed openings 26. A combustion air feed space 28, which surrounds the circumferential wall 14 or the combustion chamber 18 preferably in a ring shaped manner, is open towards the combustion chamber 18 via these combustion air feed openings 26. The air necessary for the combustion can be delivered in the direction of the combustion air feed space 28 by a combustion air feed device, not shown, for example, a side channel blower.

A flame tube 30, which is configured integrally with the circumferential wall 14 in the exemplary embodiment shown, adjoins the circumferential wall 14 in the direction of a housing longitudinal direction L. A waste gas flow space 32, into which the combustion waste gases leaving the combustion chamber 18 in the area of a flame diaphragm generally designated by 34, as is indicated by flow arrows $P_1$, enter, is formed in the interior of the flame tube 30. It should be noted that in the sense of the present invention, the combustion waste gases flowing out of the combustion chamber 18 into the waste gas flow space 32 essentially in the direction of the housing longitudinal direction L define in this area of the combustion chamber assembly unit 10 a flow direction and, relative to this flow direction, system areas positioned upstream and downstream in relation to this flow direction.

The waste gas flow space 32 is open at an axial end area 36 of the flame tube 30, which end area is located at a distance from the circumferential wall 14. The flame tube 30 or the combustion chamber housing 12 is surrounded by a pot-shaped housing 38, which has a bottom wall 40 located opposite the axial end area 36 of the flame tube 30 and a heat exchanger housing circumferential wall 42, which radially on the outside encloses the flame tube 30 and, in some areas, also the circumferential wall 14. The housing 38 may be the interior of pot-shaped heat exchanger housings inserted one into the other, which define between them a flow space for a liquid heat carrier medium. If the combustion chamber assembly unit 10 is used in conjunction with an air heater, the air to be heated may flow around the housing 38 on the outer side thereof, which faces away from the flame tube 30. To improve the heat transfer from the combustion waste gases to the housing 38, the latter may have heat transfer ribs 44 on its inner side facing the flame tube 30 in the area of the bottom wall 40 or/and in the area of the heat exchanger housing circumferential wall 42.

The combustion waste gases leaving the waste gas flow space 32 at the axial end area 36 of the flame tube 30 are axially deflected, as is indicated by flow arrows $P_2$, at the bottom wall 40 and thus they enter a waste gas backflow space 46 in the area of the first axial end area 48 thereof. As is indicated by a flow arrow $P_3$, the combustion waste gases flow in the direction of a second axial end area 50 of the waste gas backflow space 46. This second axial end area 50 of the waste gas backflow space 46 may be positioned axially overlapping, in at least some areas, with the combustion chamber 18 or with the circumferential wall 14.

In the second axial end area 50, the waste gas backflow space 46 is defined in the radially inward direction and in the axial direction by a partition 52 connected to the circumferential wall 14 or to the flame tube 30 on the outside. The partition 52 thus separates the waste gas backflow space 46 from the combustion air feed space 28 in this second axial end area 50.

An oxidation catalytic converter device 54, having, for example, a ring-shaped configuration, may be held in this area of the waste gas backflow space 46 with a slight press fit between the partition 52 and the heat exchanger housing circumferential wall 42. The oxidation catalytic converter device 54 may have, for example, a stainless steel wire mesh coated with a catalytically active material, e.g., platinum or palladium. The combustion waste gases flowing through the waste gas backflow space 46 or at least a part thereof flow through the catalytic converter device 54, so that CO and HC contained in the combustion waste gases are regenerated into $CO_2$ and $H_2O$ during the reaction taking place on the surface of the catalyst material, so that the pollutant emission is reduced. After flowing through the oxidation catalytic converter device 54, the combustion waste gases leave the waste gas backflow space 46, for example, axially in the area of an opening provided in the partition 52 towards a waste gas guide removal system.

A part of the heat generated during the catalytic reaction may be transferred, on the one hand, to the combustion air flowing in combustion air feed space 28 in the direction of the combustion chamber 18 in order to preheat this. Another part of the reaction heat may be transferred to the heat exchanger housing circumferential wall 42 and via this to the heat carrier medium to be heated. The oxidation catalytic converter device 54 is cooled and protected from overheating in this manner, on the one hand, and the heat generated in the catalytic reaction is efficiently utilized, on the other hand.

The flame diaphragm 34, which defines essentially an area of the transition from the combustion chamber 18 to the waste gas flow space 32, is connected to the circumferential wall 14 and to the flame tube 30 with two connection areas 56, 58, which are located offset in relation to one another in the direction of the housing longitudinal direction L. Starting from the upstream connection area 56 facing the combustion chamber 18, a flow-through opening 60 formed in the flame diaphragm 34 tapers to a minimal flow cross-sectional area provided in the area of an apex area 62 of the flame diaphragm 34. In the area between the upstream connection area 56 and the apex area 62, the flame diaphragm 34 provides a flow guide wall 64. This flow guide wall 64 has a convex curvature, so that the rate of change in the flow cross-sectional area decreases between the upstream connection area 56 and the apex area 62. The reduction of the flow cross-sectional area relative to a unit of length in the direction of the housing longitudinal direction L has its maximum in the area of the flow guide wall 64, which adjoins the upstream connection area 56. The rate of change is minimal or zero in the area of the apex area 62.

Adjoining the apex area 62, the flame diaphragm 34 provides a stepped expansion of the flow cross-sectional area in the transition to the flame tube 30.

The flame diaphragm 34, configured with its above-described geometry in the manner of a Venturi nozzle, defines, together with the area of the circumferential wall 14 surrounding this flame diaphragm 34 and of the flame tube 30, a waste gas transfer space 68, which surrounds the housing longitudinal direction L preferably without interruption and in a ring-shaped manner. In the circumferential wall 14 or in the flame tube 30, i.e., basically in a wall defining the waste gas transfer space 68 radially outwardly, a waste gas return device 70 comprises a plurality of first waste gas return openings 72 arranged following each other in the circumferential direction preferably in a ring-like structure. The waste gas backflow space 46 is open to the waste gas transfer space 68 via the first waste gas return openings 72. The waste gas return opening device 70 further comprises a plurality of second waste gas return openings 73 following each other in the circumferential direction preferably in a ring-like structure in the flame diaphragm 34, especially in the apex area 62 thereof. Via the second waste gas return openings 73 arranged offset in relation to the first waste gas return openings 72 in the direction of the housing longitudinal direction L, the waste gas transfer space 68 is open to the combustion chamber 18 and to the waste gas flow space 32, especially in a transition area from the combustion chamber 18 to the waste gas flow space 32. The waste gas transfer space 68 thus provides a connection between the waste gas backflow space 46 and the combustion chamber 18 or the waste gas flow space 32 via the waste gas return device 70.

During the combustion, which takes place essentially in the combustion chamber 18, the combustion waste gases flow through the flow-through opening 60. Based on the decreasing flow cross-sectional area and the Venturi effect thus generated, a vacuum builds up relative to the waste gas transfer space 68. This means that combustion waste gases drawn into the gas transfer space 68 via the first waste gas return openings 72 enter, as is indicated by flow arrows P4 and P5, the area of the combustion chamber 18 and into the area of the waste gas flow space 32 and are thus recirculated into the combustion process. The pollutant emission, especially the percentage of NOx, in the combustion waste gases can be markedly reduced due to this recirculation of combustion waste gases. The circumstance that the largest part of the heat being transported in the combustion waste gases is transferred to the heat carrier medium via the housing 38 close to the first axial end area 48 of the waste gas backflow space 46 makes an essential contribution to this. About 80% of the heat to be transferred is transferred to the housing 38 and thus to the heat carrier medium in an axial area B, which is enclosed between two lines $L_1$, $L_2$, which comprises about ⅓ of the axial extension of the waste gas backflow space 46. The combustion waste gases are thus already cooled substantially in the area of the waste gas return opening device 70, so that the recirculation of waste gases into combustion process contributes to a reduced percentage of NOx in the combustion waste gases based on the reduction of the combustion temperature, which is brought about thereby.

To reduce the emission of HC, consequently generally hydrocarbons, to the greatest extent possible in a combustion chamber assembly unit 10 even in an operating state in which the temperature of the catalyst material of the oxidation catalytic converter device 54 is below the light-off temperature of 250° C. to 300° C., which is necessary to carry out the catalytic reaction for converting CO and HC, a hydrocarbon storage device 74 is provided upstream relative to the oxidation catalytic converter device 54, and said hydrocarbon storage device may comprise, for example, a hydrocarbon storage catalyst 78, which is configured with a carrier, e.g., one consisting of stainless steel, which is coated with zeolite material. The hydrocarbon storage device 74 is advantageously also arranged close to the second axial end area 50 of the waste gas backflow space 46 in the area between the partition 52 and the circumferential wall or is held between these two walls.

The hydrocarbon storage catalyst 78 of the hydrocarbon storage device 74 has a desorption temperature in the range of 300° C. to 350° C. This desorption temperature is consequently above the light-off temperature of the oxidation catalytic converter device 54. It is guaranteed in this manner that hydrocarbon stored in the hydrocarbon storage device 74 will again be desorbed, i.e., released from the hydrocarbon storage device 74 and can reach the oxidation catalytic converter device 54 only when this has a sufficiently high temperature for carrying out the catalytic reaction. No actions are thus necessary in terms of actuation or regulation to trigger this mechanism, i.e., the storage and the release of hydrocarbon in the hydrocarbon storage device 74. The temperature rise in both the area of the oxidation catalytic converter device 54 as well as in the area of the hydrocarbon storage device 74, which temperature rise takes place when a vehicle heater configured with the combustion chamber assembly unit 10, is sufficient alone to ensure that the light-off temperature of the oxidation catalytic converter device 54 reached first and the desorption temperature of the hydrocarbon storage device 74 then reached when the temperature of the oxidation catalytic converter device 54 is at or above the light-off temperature, and hydrocarbon released from this hydrocarbon storage device 74 is reacted with the unburned residual oxygen being transported in the combustion waste gases in the oxidation catalytic converter device.

It should be noted here that the oxidation catalytic converter device 54 and the hydrocarbon storage device 74 may be structurally combined with one another. For example, the hydrocarbon storage device 74 may be coated in at least some areas with the catalyst material of the oxidation catalytic converter device 54, so that hydrocarbon can be stored, again released, and converted at the catalyst material of the oxidation catalytic converter device in the same space area.

A nitrogen oxide storage device, which is generally designated by 76 and which may comprise, for example, a nitrogen oxide storage catalyst 80, is further provided in the combustion chamber assembly unit 10 configured according to the present invention. This storage catalyst may be made of barium and thus store nitrogen oxides in an oxygen-rich, lean atmosphere. The nitrogen oxide storage device 76 is preferably also arranged in the second axial end area 50 between the partition 52 and the circumferential wall 42. It is guaranteed by this positioning of the nitrogen oxide storage device 76 that this storage device 76 has a temperature in the range of 250° C. to 500° C. during the normal operation of the combustion chamber assembly unit 10, i.e., a temperature in a range in which the nitrogen oxide storage catalyst 80 is capable of storing nitrogen oxides due to the formation of barium nitrate.

If the nitrogen oxide storage catalyst reaches a state of saturation, which can be detected, for example, by a sensory method or can be determined by monitoring the operating times, release of nitrogen oxide molecules into the waste gas stream and a reduction into nitrogen can be achieved by operating the vehicle heater under slightly substoichiometric combustion conditions, i.e., with a fuel-rich, fat mixture of fuel and combustion air, due to the reducing effect of the hydrocarbons being transported in the combustion waste gases or/and of the CO contained therein.

It should be noted that the provision of a nitrogen oxide storage device 76 may take place in addition to the above-described actions for recirculating nitrogen oxide into the combustion process or as an alternative thereto. It should further be noted that a positioning different from that shown in FIG. 1 may also be selected for the nitrogen oxide storage device 76. For example, this nitrogen oxide storage device 76 could also be provided downstream of the hydrocarbon storage device 74, for example, between the latter and the oxidation catalytic converter device 54 or downstream of the oxidation catalytic converter device 54, if this is advantageous for reasons of the operating temperature of the nitrogen oxide storage device 76, which temperature is optimal for the storage of nitrogen oxides. The positioning of the nitrogen oxide storage device 76 upstream in relation to the oxidation catalytic converter device 54 may advantageously be used to convert excess hydrocarbons present during the regeneration of the nitrogen oxide storage catalyst 80 into water and carbon dioxide by an oxygen storage material, e.g., cerium, which is integrated in the oxidation catalytic converter device 54.

A markedly reduced pollutant emission can be achieved with the combustion chamber assembly unit 10 configured according to the present invention both due to the recirculation of combustion waste gases forced based on the special geometry of the flame diaphragm 34 into the combustion process and due to the flow through a catalytic converter device prior to the discharge of the combustion waste gases from the combustion chamber assembly unit 10. These two actions are advantageously provided in the combustion chamber assembly unit 10 in conjunction with one another. Each of the actions may, however, also be provided alone in itself, without the other action of bringing about a reduced percentage of pollutants in the waste gases discharged from the combustion chamber assembly unit 10 being necessarily provided as well.

It should finally be noted that the above-described combustion chamber assembly unit may be varied in many different aspects, without abandoning the principles of the present invention. For example, the flame diaphragm could thus be configured integrally with the circumferential wall surrounding the combustion chamber or/and it could be configured integrally with the flame tube axially following this circumferential wall. The circumferential wall and the flame tube also do not necessarily have to be provided by a single component as integral components thereof. For example, the flame tube could thus also be configured integrally with the partition. The flame diaphragm could also be provided as an integral component of the partition, while the circumferential wall and the flame tube are provided as separate components. The connection of the flame diaphragm to, for example, the flame tube or to the circumferential wall consequently comprises in the sense of the present invention both the connection of two separate components, for example, by connection in substance, and the integral provision of two system areas, for example, the flame diaphragm and the circumferential wall, as parts of a component.

While specific embodiments of the invention have been shown and described in detail to illustrate the application of the principles of the invention, it will be understood that the invention may be embodied otherwise without departing from such principles.

What is claimed is:

1. A combustion chamber assembly unit for a fuel-operated vehicle heater, the combustion chamber assembly comprising:

a combustion chamber housing with a combustion chamber defined by a circumferential wall and by a bottom area;

a flame tube, which follows the circumferential wall in a direction of a housing longitudinal axis and surrounds a waste gas flow space, which waste gas flow space is open in the direction of the housing longitudinal axis, wherein a waste gas backflow space is formed between the flame tube and a housing wall of a housing at least partially surrounding the flame tube, the waste gas flow space being open to the waste gas backflow space in a first axial end area of the waste gas backflow space;

a combustion air feed space surrounding the circumferential wall and being open to the combustion chamber via a plurality of combustion air feed openings provided in the circumferential wall;

a partition separating the combustion air feed space from the waste gas backflow space;

an oxidation catalytic converter device positioned downstream in relation to the combustion chamber in a second axial end area of the waste gas backflow space such as to surround the partition and configured such that combustion waste gas flows therethrough; and a hydrocarbon storage device or a nitrogen oxide storage device or both a hydrocarbon storage device and a nitrogen oxide storage device provided in the second axial end area of the waste gas backflow space.

2. A combustion chamber assembly unit in accordance with claim 1, wherein:
the hydrocarbon storage device comprises a hydrocarbon storage catalyst; and
a desorption temperature of the hydrocarbon storage catalyst is above a light-off temperature of the oxidation catalytic converter device.

3. A combustion chamber assembly unit in accordance with claim 2, wherein the hydrocarbon storage device is made of zeolite material.

4. A combustion chamber assembly unit in accordance with claim 1, wherein the nitrogen oxide storage device comprises a nitrogen oxide storage catalyst.

5. A combustion chamber assembly unit in accordance with claim 4, wherein the nitrogen oxide storage catalyst is made of barium.

6. A combustion chamber assembly unit in accordance with claim 1, wherein the hydrocarbon storage device or the nitrogen storage device or the hydrocarbon storage device and the nitrogen storage is arranged upstream in relation to the oxidation catalytic converter device.

7. A combustion chamber assembly unit in accordance with claim 1, wherein:
the oxidation catalytic converter device is arranged to axially adjoin the partition, or
the hydrocarbon storage device or the nitrogen storage device or any combination of the hydrocarbon storage device and the nitrogen oxide storage device is arranged to surround the partition, or
the oxidation catalytic converter device is arranged to axially adjoin the partition and the hydrocarbon storage device or the nitrogen storage device or any combination of the hydrocarbon storage device and the nitrogen oxide storage device is arranged to surround the partition.

8. A combustion chamber assembly unit in accordance with claim 7, wherein the oxidation catalytic converter device or the hydrocarbon storage device or the nitrogen storage device or any combination of the oxidation catalytic converter device and the hydrocarbon storage device and the nitrogen oxide storage device is arranged between the partition and the housing.

9. A combustion chamber assembly unit in accordance with claim 1, further comprising:
a flame diaphragm with a flow-through opening; and
a waste gas return opening device in an axial area of the flame diaphragm for returning combustion waste gases flowing in the waste gas backflow space into the combustion chamber or into the waste gas flow space or into both the combustion chamber and into the waste gas flow space.

10. A combustion chamber assembly unit in accordance with claim 1, wherein the bottom area comprises:
an evaporator medium carrier; and
an evaporator medium, which is porous on a side of the evaporator medium carrier facing the combustion chamber.

11. A combustion chamber assembly unit in accordance with claim 1, wherein the housing is a pot-shaped heat exchanger housing comprising:
a bottom wall located axially opposite the flame tube; and
a heat exchanger housing circumferential wall, which surrounds the flame tube and defines the waste gas backflow space radially outwardly.

12. A vehicle heater, comprising a combustion chamber assembly unit comprising:
a combustion chamber housing with a combustion chamber defined by a circumferential wall and by a bottom area;
a flame tube, which follows the circumferential wall in a direction of a housing longitudinal axis and surrounds a waste gas flow space, which waste gas flow space is open in the direction of the housing longitudinal axis, wherein a waste gas backflow space is formed between the flame tube and a housing wall of a housing at least partially surrounding the flame tube, the waste gas flow space being open to the waste gas backflow space in a first axial end area of the waste gas backflow space;
a combustion air feed space surrounding the circumferential wall and being open to the combustion chamber via a plurality of combustion air feed openings provided in the circumferential wall;
a partition separating the combustion air feed space from the waste gas backflow space;
an oxidation catalytic converter device positioned downstream in relation to the combustion chamber in a second axial end area of the waste gas backflow space such as to surround the partition and configured such that combustion waste gas flows therethrough; and
a hydrocarbon storage device or a nitrogen oxide storage device or both a hydrocarbon storage device and a nitrogen oxide storage device provided in the second axial end area of the waste gas backflow space.

13. A vehicle heater in accordance with claim 12, wherein:
the hydrocarbon storage device comprises a hydrocarbon storage catalyst;
a desorption temperature of the hydrocarbon storage catalyst is above a light-off temperature of the oxidation catalytic converter device;
the nitrogen oxide storage device comprises a nitrogen oxide storage catalyst; and
the hydrocarbon storage device or the nitrogen storage device or the hydrocarbon storage device and the nitrogen storage is arranged upstream in relation to the oxidation catalytic converter device.

14. A vehicle heater in accordance with claim 13, wherein:
the oxidation catalytic converter device is arranged to axially adjoin the partition, or
the hydrocarbon storage device or the nitrogen storage device or any combination of the hydrocarbon storage device and the nitrogen oxide storage device is arranged to surround the partition, or
the oxidation catalytic converter device is arranged to axially adjoin the partition and the hydrocarbon storage device or the nitrogen storage device or any combination of the hydrocarbon storage device and the nitrogen oxide storage device is arranged to surround the partition.

15. A vehicle heater in accordance with claim 12, wherein:
the housing is a pot-shaped heat exchanger housing comprising:
a bottom wall located axially opposite the flame tube; and a heat exchanger housing circumferential wall, which surrounds the flame tube and defines the waste gas backflow space radially outwardly; and the bottom area comprises:
an evaporator medium carrier; and
an evaporator medium, which is porous on a side of the evaporator medium carrier facing the combustion chamber.

16. A combustion chamber assembly unit for a fuel-operated vehicle heater, the combustion chamber assembly comprising:
a combustion chamber housing comprising a waste gas flow space, a waste gas backflow space, a combustion chamber, a circumferential wall and a housing structure, the housing structure comprising a housing structure wall, a first axial end area, a second axial end area and a housing longitudinal axis, the first axial end area being located axially opposite the second axial end area with respect to the housing longitudinal axis, the circumferential wall defining at least a portion of the combustion chamber, the circumferential wall comprising a plurality of combustion air feed openings;
a flame tube extending downstream of the circumferential wall with respect to a flow of fluid in the combustion chamber housing, the flame tube surrounding the waste gas flow space, the waste gas flow space being open in a direction of the housing longitudinal axis, wherein at least the flame tube and the housing structure wall define the waste gas backflow space, the housing structure wall at least partially surrounding the flame tube, the waste gas flow space being open to the waste gas backflow space in the first axial end area;
a partition connected to the circumferential wall and the housing structure wall, at least a portion of the circumferential wall and at least a portion of the partition defining a combustion air feed space surrounding the circumferential wall, the combustion air feed space being in fluid communication with the combustion chamber via the plurality of combustion air feed openings, wherein the combustion air feed openings are provided in the circumferential wall;
an oxidation catalytic converter device positioned downstream relative to the combustion chamber in the second axial end area, the oxidation catalytic converter device surrounding at least a portion of the partition and the oxidation catalytic converter device being configured such that combustion waste gases flow through the oxidation catalytic converter device; and
a hydrocarbon storage device or a nitrogen oxide storage device or both a hydrocarbon storage device and a nitrogen oxide storage device provided in the second axial end area.

17. A combustion chamber assembly unit in accordance with claim 16, wherein the hydrocarbon storage device or the nitrogen oxide storage device or both the hydrocarbon storage device and the nitrogen oxide storage device is located radially between the partition and the second axial end area with respect to the housing longitudinal axis.

18. A combustion chamber assembly unit in accordance with claim 16, wherein the hydrocarbon storage device or the nitrogen oxide storage device or both the hydrocarbon storage device and the nitrogen oxide storage device is in contact with the partition and the second axial end area.

19. A combustion chamber assembly unit in accordance with claim 16, wherein the second axial end area is radially opposite the combustion chamber with respect to the housing longitudinal axis.

20. A combustion chamber assembly unit in accordance with claim 16, wherein a portion of the partition defines a portion of the waste gas back flow space.

* * * * *

UNITED STATES PATENT AND TRADEMARK OFFICE
CERTIFICATE OF CORRECTION

PATENT NO. : 11,027,593 B2  
APPLICATION NO. : 15/866977  
DATED : June 8, 2021  
INVENTOR(S) : Eberspach Page 1 of 1

It is certified that error appears in the above-identified patent and that said Letters Patent is hereby corrected as shown below:

On the Title Page

Item (73), should read:
(73) Assignee: Eberspächer Climate Control Systems GmbH
          Esslingen (DE)

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*